United States Patent
Shapoval

(10) Patent No.: US 7,165,482 B2
(45) Date of Patent: Jan. 23, 2007

(54) FASTENER AND DRIVING TOOL WITH RETAINING BLADE

(76) Inventor: Sergei Shapoval, 215 W. 94th St., Kansas City, MO (US) 64114

( * ) Notice: Subject to any disclaimer, the term of this patent is extended or adjusted under 35 U.S.C. 154(b) by 128 days.

(21) Appl. No.: 10/994,920

(22) Filed: Nov. 22, 2004

(65) Prior Publication Data

US 2005/0109171 A1   May 26, 2005

Related U.S. Application Data

(60) Provisional application No. 60/524,451, filed on Nov. 24, 2003.

(51) Int. Cl.
*B25B 23/08* (2006.01)
*F16B 35/06* (2006.01)

(52) U.S. Cl. .................. 81/451; 81/460; 403/406; 403/407

(58) Field of Classification Search ............ 81/451, 81/452, 436, 125, 460; 411/406, 407, 911
See application file for complete search history.

(56) References Cited

U.S. PATENT DOCUMENTS

| | | | | |
|---|---|---|---|---|
| 2,046,837 A | * | 7/1936 | Phillips | .............. 81/460 |
| 2,304,704 A | * | 12/1942 | O'Leary | .............. 411/406 |
| 2,954,719 A | * | 10/1960 | Vaughn | .............. 411/406 |
| 2,994,354 A | | 8/1961 | Vaughn | |
| 3,540,342 A | * | 11/1970 | Vaughn | .............. 411/407 |
| 3,695,321 A | | 10/1972 | Garehime, Jr. | |
| 4,538,486 A | * | 9/1985 | Lutrat | .............. 81/460 |
| 5,347,893 A | * | 9/1994 | Mikic et al. | .............. 81/436 |
| 5,498,265 A | | 3/1996 | Asnis et al. | |
| 5,868,049 A | * | 2/1999 | Kanwal | .............. 81/460 |

* cited by examiner

*Primary Examiner*—Hadi Shakeri
(74) *Attorney, Agent, or Firm*—Mark E. Brown

(57) ABSTRACT

A combination fastener driver and fastener, the fastener driver including a generally hourglass-shaped tip which flares from the shank to the tip and the fastener includes a generally hourglass-shaped slot in the fastener head with under cut side walls. The flared walls of the driver tip engage the undercut side walls of the fastener slot to lock the tip in the slot when driving the fastener. A waist portion in the driver tip engages a waist portion in the fastener slot to prevent the tip from laterally slipping out of the slot during use.

20 Claims, 5 Drawing Sheets

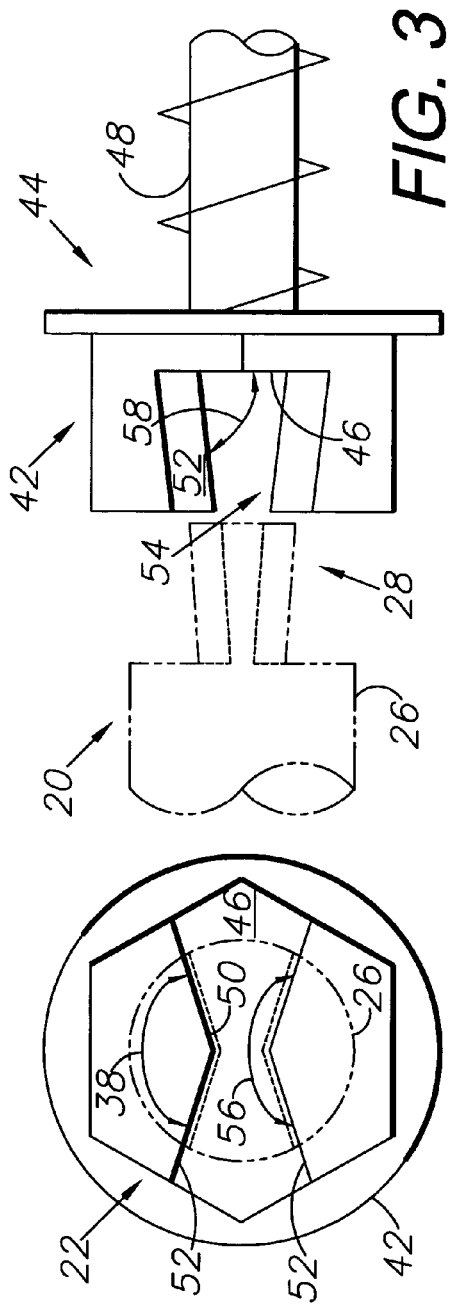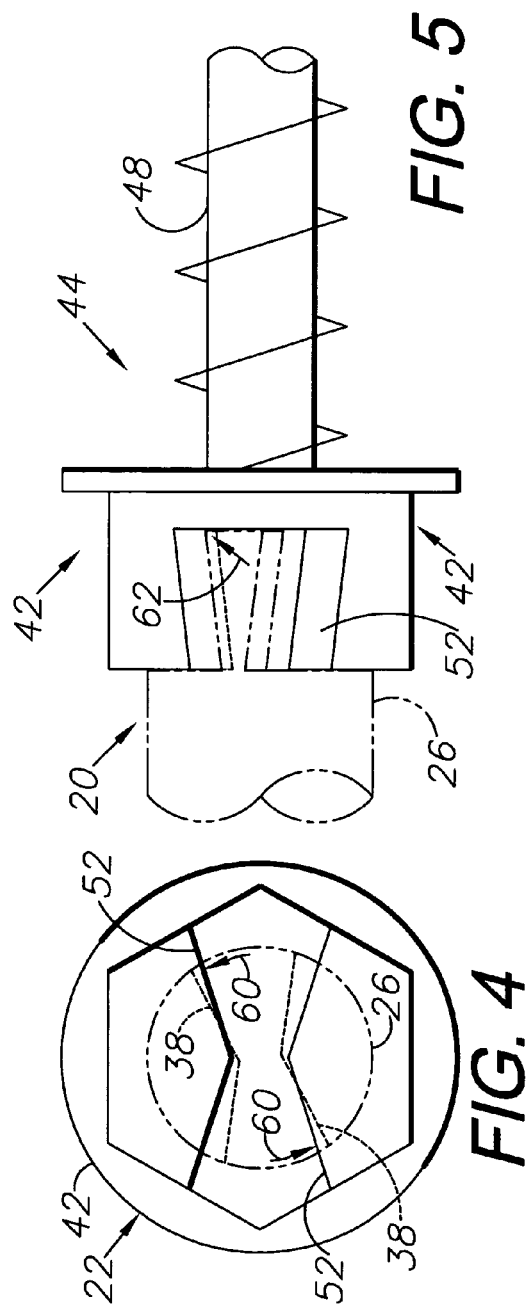

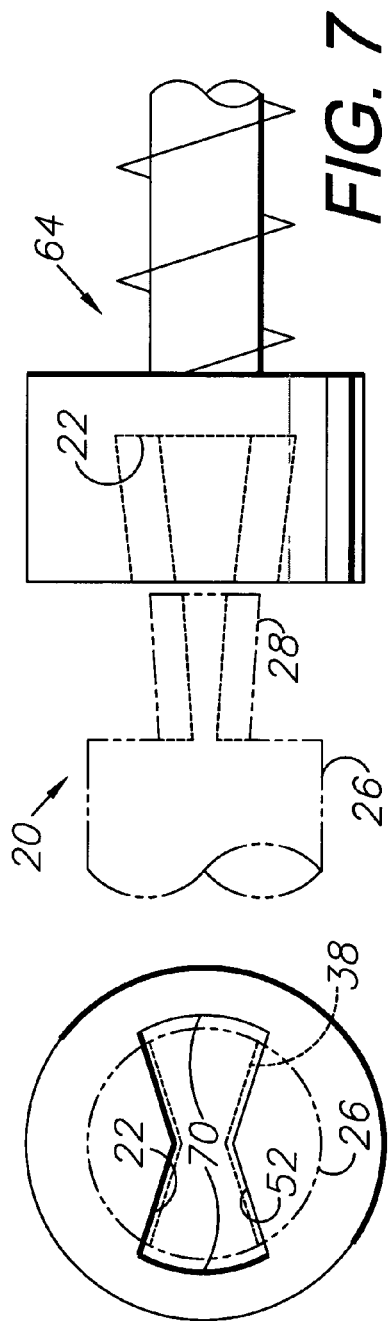

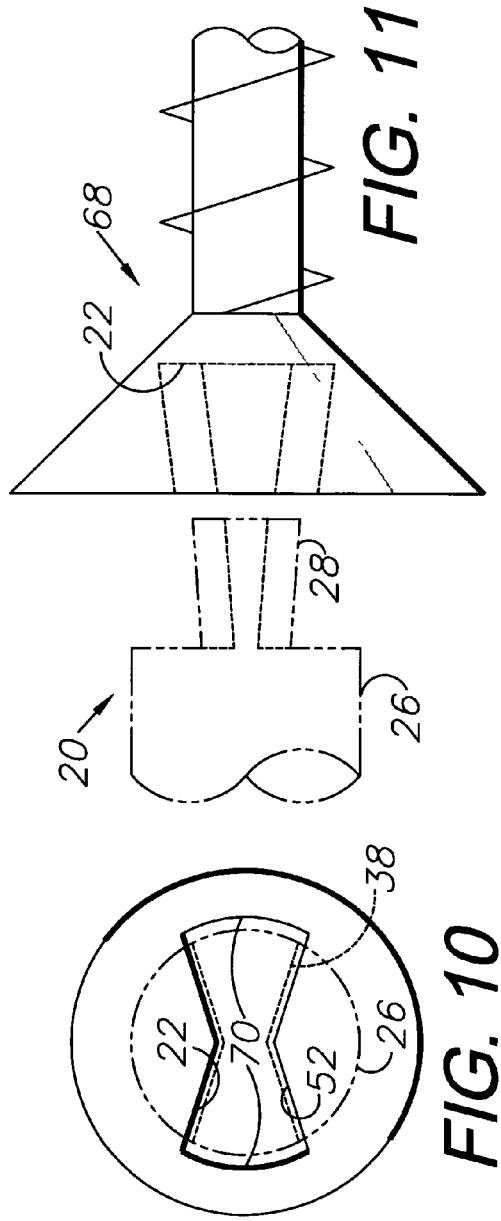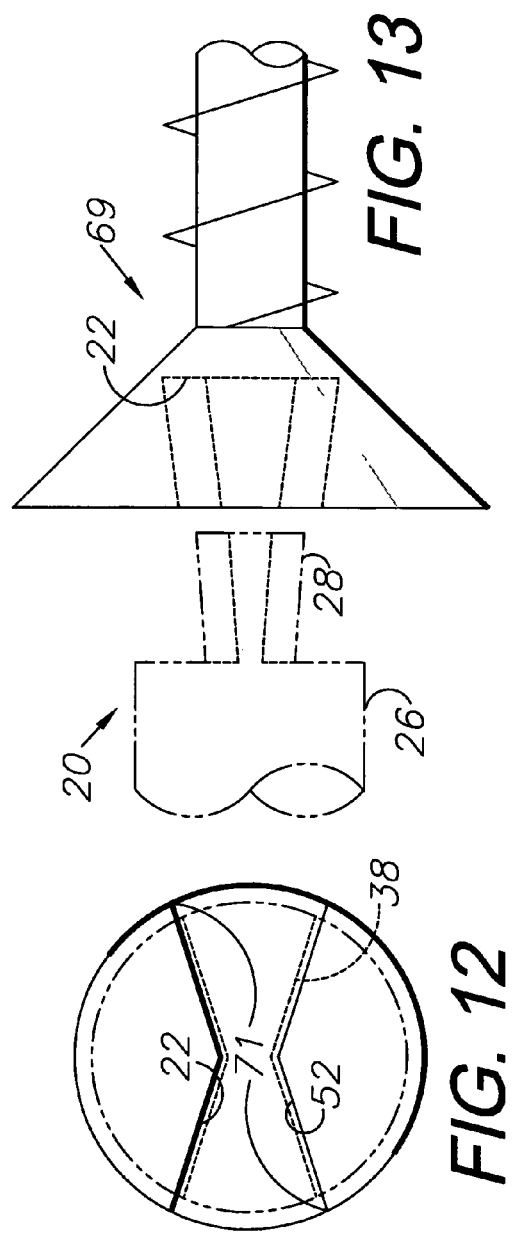

FASTENER AND DRIVING TOOL WITH RETAINING BLADE

CROSS-REFERENCE TO RELATED APPLICATION

This application claims the benefit of U.S. provisional application No. 60/524,451, filed Nov. 24, 2003, which is incorporated herein by reference.

BACKGROUND OF THE INVENTION

The present invention relates to fasteners and fastener drivers and, more particularly, to a fastener and fastener driver which are configured to retain the blade of the fastener driver in the slot in the head of the fastener.

Screws or fasteners and the drivers to rotate the screws or fasteners are known in the art. Typical fastener head configurations include a standard slotted head fastener and a Phillips head fastener. The fastener head shape may be round, flat, or oval, for example. The shape of the slot in a fastener head is square or rectangular with the sides perpendicular to the bottom, and the width of the slot extending all the way across the fastener head. The shape of a Phillips head is generally in a symmetrical cross with the sides tapering to a point in the center of the cross. The width and depth of the slot and Phillips head may vary according to industry standard sizes.

The standard straight-blade screw driver has a flat tip which tapers from the screw driver shank to the tip. A standard Phillips screw driver has a tip which also tapers from the shank to the tip and the tip is cross shaped to fit in the Phillips head screw. The tip sizes of these screw drivers are according to industry standards to fit the corresponding screw head.

A common problem with these screws and screw drivers is the shape of the slot and cross along with the shape of the related screw driver tip creates a force which pushes the screw driver tip away from the screw head and results in the screw driver slipping. The user of the screw driver must apply a counter force to overcome this force to push the tip of screw driver into the head when tightening or loosening a screw. If the torque required to drive the screw into a substraight material is greater than the user's force pushing the tip of the screw driver into the slot of the screw head the tip of the screw driver slips out of the screw head damaging the screw and/or substraight. Additionally, a flat blade screw driver tends to slip along the length of the slot with the same results.

SUMMARY OF THE INVENTION

The present invention includes a fastener driver having a tip which tapers outwardly from the shank to the tip and which is generally hourglass shaped to reduce the occurrence of the tip slipping out of the fastener slot. The corresponding fastener of the present invention has a slot which is wider at the base than at the opening and generally hourglass shaped to receive the tip of the fastener driver.

BRIEF DESCRIPTION OF THE DRAWINGS

FIG. 2 is a top plan view of a hex washer head fastener with a locking slot of the present invention.

FIG. 3 is a partial side view of the fastener of FIG. 2.

FIG. 4 is a top plan view of the fastener of FIG. 2 shown with the tip of the fastener driver engaged in the locking slot.

FIG. 5 is a partial side view of the fastener and fastener driver tip of FIG. 4.

FIG. 6 is a top plan view of a flat Fillister head fastener with the locking slot of the present invention.

FIG. 7 is a partial side view of the fastener of FIG. 6.

FIG. 8 is a top plan view of a round washer head fastener with the locking slot of the present invention.

FIG. 9 is a partial side view of the fastener of FIG. 8 shown with the tip of the fastener driver engaged in the locking slot.

FIG. 10 is a top plan view of a flat head fastener with a closed-ended locking slot of the present invention.

FIG. 11 is a partial side view of FIG. 10.

FIG. 12 is a top plan view of another configuration flat head fastener with an open-ended locking slot of the present invention.

FIG. 13 is a partial side view of FIG. 12.

DETAILED DESCRIPTION

Figure 1:
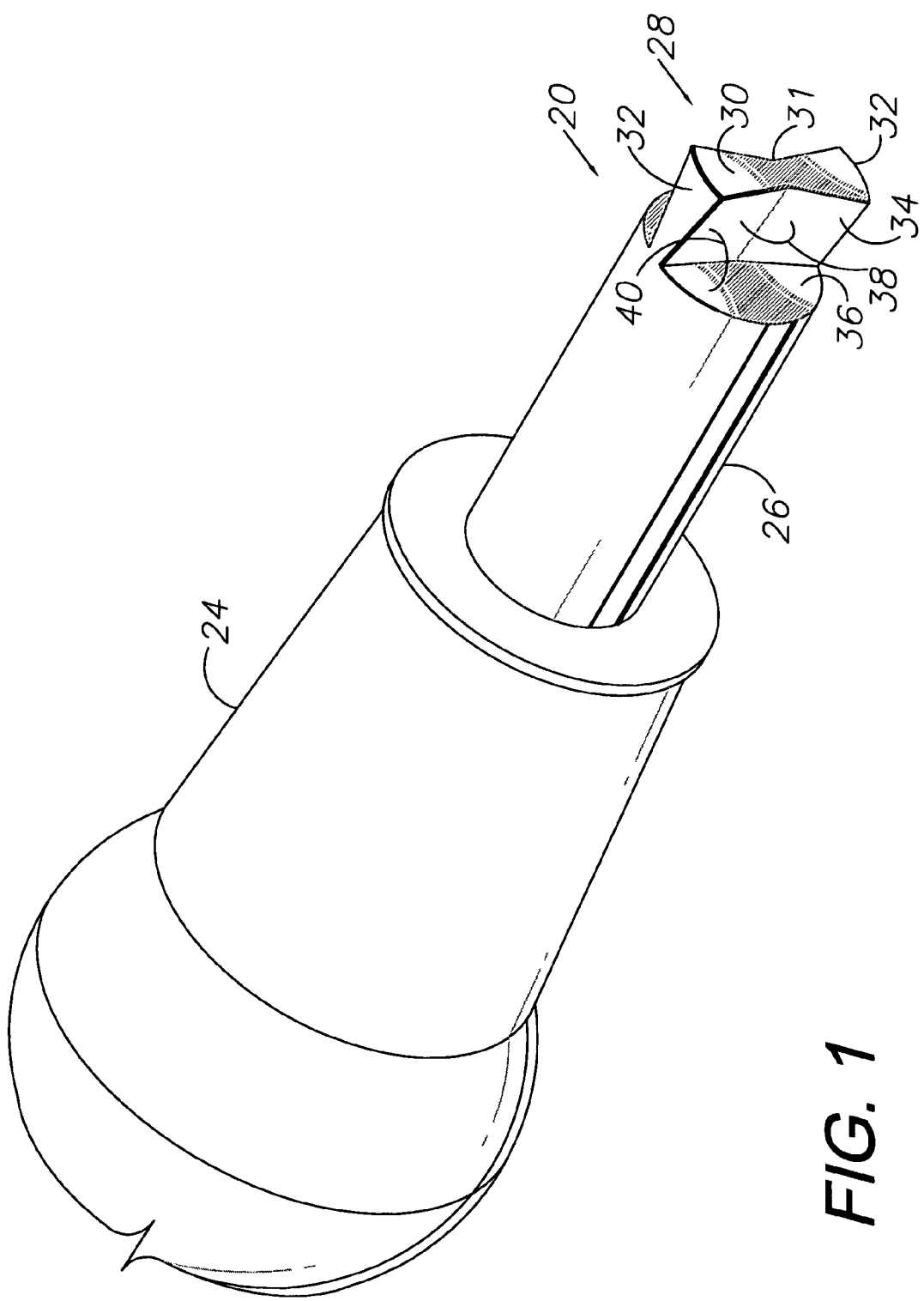
FIG. 1 is a partial perspective view of the tip of the fastener driver of the present invention.

Referring to FIGS. 1–3, a fastener driver of the present invention is generally indicated by reference numeral 20, and a locking slot of the present invention is generally indicated by reference numeral 22.

Fastener driver 20 includes a handle 24, a shank 26 and a tip 28. The tip 28 includes a flat end 30 which is generally a six-sided polygon shape with four vertices or generally hourglass shaped with a waist 31 generally midway between opposed flared ends 32. The opposed ends 32 of the tip are generally curved with a radius of curvature of the shank 26 and are generally wedge shaped. The tip includes four other walls 34, which taper outwardly from the base 36 of the tip 28 adjoining the shank 26 to the end 30 of the tip 28 such that the thickness of the tip 28 is expanded from the base 36. The angle 38 between adjoining side walls 34 may be between approximately 170 degrees and 150 degrees. The angle 40 between a side wall 34 and the base 36 may be between approximately 80 degrees and 60 degrees. The tip 28 of fastener driver 20 may be machined from standard steel stock.

The locking slot 22 in the head 42 of fastener 44 is adapted to receive the tip 28 of fastener driver 20. The base 46 of locking slot 22 is generally flat and generally perpendicular to the shaft 48 of fastener 44. The locking slot 22 is generally hourglass shaped with a waist 50 which extends into the interior of locking slot 22. The interior walls 52 of locking slot 22 taper outwardly from the slot opening 54 to the base 46. The angle 56 between adjoining side walls 52 is between approximately 190 degrees and 210 degrees. The angle 58 between the side walls 52 and the base 46 of the locking slot 22 is between approximately 80 degrees and 60 degrees.

Referring to FIGS. 4 and 5, as the fastener driver 20 is rotated in a counterclockwise direction, transverse sides 38 of fastener driver 20 contact transverse side walls 52 of locking slot 22. A torque is developed as the fastener driver 20 is turned as indicated by force vectors 60. As the driver 20 and fastener 44 are turned, the walls 34 of tip 28 try to slide farther into the slot 22 of the fastener toward base 46 holding the driver tip 28 more tightly without having to push in a direction along the longitudinal axis of the fastener driver 20. The tip 28 of the fastener driver 20 is forced into the corners of the slot 22 indicated by reference numeral 62. Additionally, the waist 50 of the slot 22 prevents the tip 28 of fastener driver 20 from slipping through the slot 22 as force is applied.

Referring to FIGS. 6–13, locking slot 22 is shown used with a Fillister head fastener 64, a round head fastener 66, a flat head fastener 68 with a locking slot 22 having closed ends 70 and a flat head fastener 69 with a locking slot 22 having open ends 71. These fasteners are used for illustrative purposes only and are not intended to limit the present invention to these specifically mentioned fastener head types. As shown in FIGS. 6, 7, 10 and 11, slot 22 may be closed on each end 70, or open on each end 71 as shown in FIG. 12.

Figure 14:
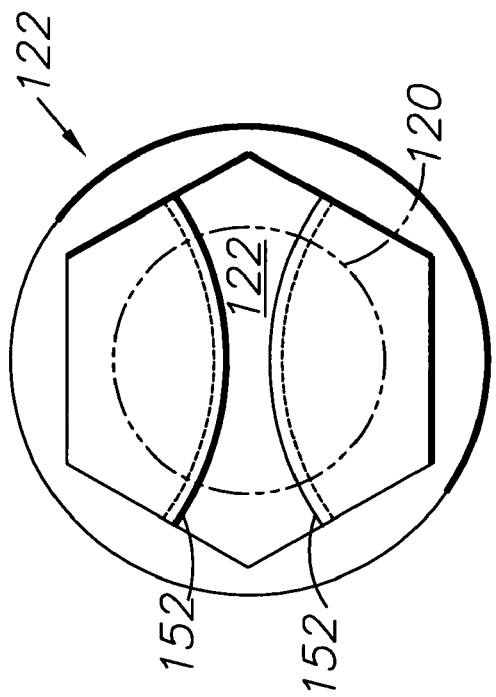
FIG. 14 is a top plan view of another configuration hex washer head fastener with a curved-wall locking slot of the present invention.
Figure 15:
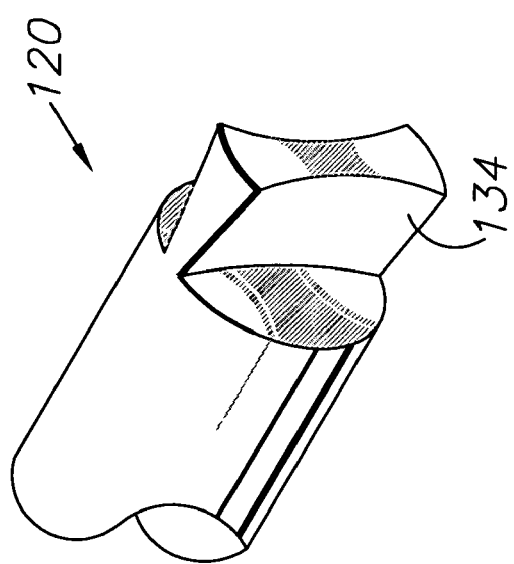
FIG. 15 is a fragmentary, perspective view of the tip of another configuration fastener driver, with curved engagement walls adapted for mating with the curved walls of the locking slot of the fastener shown in FIG. 14.

Referring to FIGS. 14 and 15, a fastener driver 120 comprising a modified embodiment of the present invention is shown, and includes curved engagement walls 134 adapted for mating with corresponding curved engagement walls 152 of a modified embodiment fastener 144 with a modified locking slot 122. The fastener driver 120 and the fastener 144 otherwise function in a similar manner to the drivers and fasteners described above.

It is to be understood that while certain embodiments and/or aspects of the invention have been shown and described, the invention is not limited thereto and encompass various other embodiments/aspects.

The invention claimed is:

1. A fastener driver for use in combination with a fastener to be driven thereby, said fastener driver having a shank and a tip extending from an end of said shank;

said tip of said fastener driver having a substantially circular base secured to said end of said shank and a free end portion projecting from the base, said free end portion of said tip having a generally hourglass shape with opposing flared end portions defining a linear waist portion generally midway between said flared end portions of said free end of said tip, each of said opposing flared end portions of said free end of said tip having a pair of opposed, flat substantially rectangular side walls which taper continuously outwardly from the base from a longitudinal axis of said shank at the waist and taper inwardly from a transverse axis of said tip towards the base, said side walls of said flared end portions on adjacent sides of said flared end portions of said free end of said tip intersecting to form a dihedral angle with said linear waist;

said fastener having a shank, a head portion, and a slot in said head portion generally perpendicular to a longitudinal axis of said fastener shank, said slot in said head of said fastener having an opening, a base and a generally hourglass shape with opposing flared end portions, each of said flared end portions having a pair of opposed undercut flat, substantially rectangular side walls which taper continuously inwardly along a transverse axis of said slot and intersect with said undercut side walls of said opposing flared end portion of said slot to form a dihedral angle with a linear waist portion generally midway between said opposing flared end portions of said slot, said base of said slot having a cross-sectional area greater than a cross-sectional area of said opening of said slot;

said slot defining a depth substantially equal to a height of the projection of said free end; and said fastener slot adapted to mate with said tip of said fastener driver with said undercut side walls of said slot in said head of said fastener engaging said outwardly tapered side walls of said free end of said tip of said fastener driver over a pair of generally rectangular contact areas to releasably lock said free end of said tip of said fastener driver in said slot of said head of said fastener.

2. The combination as set forth in claim 1 wherein said waist portion of said fastener driver tip is adapted to engage said waist portion of said slot in said fastener head to secure said fastener driver tip in said slot in said fastener head against lateral movement.

3. The combination as set forth in claim 1 wherein said fastener has a rounded head.

4. The combination as set forth in claim 1 wherein said fastener has a pan head.

5. The combination as set forth in claim 1 wherein said fastener has a flat fillister head.

6. The combination as set forth in claim 1 wherein said fastener has a flat head.

7. The combination as set forth in claim 1 wherein said fastener driver further comprises a handle secured to said shank opposite said tip.

8. The combination as set forth in claim 1 wherein said intersection of said adjacent side walls of said flared end portions presents an intersecting angle of between approximately 170 and 150 degrees.

9. The combination as set forth in claim 1 wherein said taper of said side walls of said free end portion of said lip of said fastener driver presents an angle of between approximate 80 and 60 degrees between a plane generally perpendicular to a longitudinal axis of said shank and each of said side walls.

10. The combination as set forth in claim 1 wherein said intersections between said undercut side walls of said opposing flared end portions of said slot present an angle of between approximately 190 and 210 degrees.

11. The combination as set forth in claim 1 wherein an intersection between said undercut side walls of said opposing flared end portions of said slot and said base of said slot present an angle of between approximately 80 and 60 degrees.

12. The combination as set forth in claim 1 wherein a cross-sectional area of said free end of said tip of said fastener driver is less than said cross-sectional area of said opening of said slot of said head of said fastener.

13. A fastener driver for use in combination with a fastener to be driven thereby, said fastener driver having a shank and a tip extending from an end of said shank;

said tip of said fastener driver having a substantially circular flat base secured to said end of said shank and a flat free end portion projecting from the base, said free end portion of said tip having a shape with opposing flared end portions defining a waist portion generally midway between said flared end portions of said free end of said tip, each of said opposing flared end portions of said free end of said tip having a pair of opposed, substantially rectangular concave side walls which taper continuously outwardly from the base from a longitudinal axis of said shank at the waist and taper inwardly from a transverse axis of said tip towards the base, said side walls of said flared end portions on adjacent sides of said flared end portions of said free end of said tip intersecting to form the waist, said waist being narrower than said end portions;

said fastener having a shank, a head portion, and a slot in said head portion generally perpendicular to a longitudinal axis of said fastener shank, said slot in said head of said fastener having an opening, a base and a shape with opposing flared end portions, a pair of opposed undercut concave side walls which taper inwardly along a transverse axis of said slot a waist portion generally midway between said opposing flared end portions of said slot, said waist portion being narrower than said end portions, said base of said slot having a cross-sectional area greater than a cross-sectional area of said opening of said slot; and said slot defining a depth substantially equal to a height of the projection of said flat free end; and said fastener slot adapted to mate with said tip of said fastener driver with said undercut side walls of said slot in said head of said fastener engaging said outwardly tapered side walls of said free end of said tip of said fastener driver to releasably lock said free end of said tip of said fastener driver in said slot of said head of said fastener.

14. The combination as set forth in claim 1 wherein said waist portion of said fastener driver tip is adapted to engage said waist portion of said slot in said fastener head to secure said fastener driver tip in said slot in said Fastener head against lateral movement.

15. The combination as set forth in claim 13 wherein said fastener has a rounded head.

16. The combination as set forth in claim 13 wherein said fastener has a pan head.

17. The combination as set forth in claim 13 wherein said fastener has a flat fluster head.

18. The combination as set forth in claim 13 wherein said fastener has a flat head.

19. The combination as set forth in claim 13 wherein said fastener driver further comprises a handle secured to said shank opposite said tip.

20. A fastener driver for use in combination with a fastener to be driven thereby, said fastener driver having a shank and a tip extending from an end of said shank;

said tip of said fastener driver having a substantially circular base secured to said end of said shank and a free end portion projecting from the base, said free end portion of said tip having a generally hourglass shape with opposing flared end portions defining a linear waist portion generally midway between said flared end portions of said free end of said tip, each of said opposing flared end portions of said free end of said tip having a pair of opposed, flat substantially rectangular side walls which taper continuously outwardly from the base from a longitudinal axis of said shank at the waist and taper inwardly from a transverse axis of said tip towards the base, said side walls of said flared end portions on adjacent sides of said flared end portions of said free end of said tip intersecting to form a dihedral angle with said linear waist said fastener driver further comprising a handle secured to said shank opposite said tip;

said fastener having a shank, a head portion, and a slot in said head portion generally perpendicular to a longitudinal axis of said fastener shank, said slot in said head of said fastener having an opening, a base and a generally hourglass shape with opposing flared end portions, each of said flared end portions having a pair of opposed undercut flat, substantially rectangular side walls which taper continuously inwardly along a transverse axis of said slot and intersect with said undercut side walls of said opposing flared end portion of said slot to form a dihedral angle with a linear waist portion generally midway between said opposing flared end portions of said slot, said base of said slot having a cross-sectional area greater than a cross-sectional area of said opening of said slot;

said slot defining a depth substantially equal to a height of the projection of said free end;

said fastener slot adapted to mate with said tip of said fastener driver with said undercut side walls of said slot in said head of said fastener engaging said outwardly tapered side walls of said free end of said tip of said fastener driver over a pair of generally rectangular contact areas to releasably lock said free end of said tip of said fastener driver in said slot of said head of said fastener; and said waist portion of said fastener driver tip being adapted to engage said waist portion of said slot in said fastener head to secure said fastener driver tip in said slot in said fastener head against lateral movement.

* * * * *